US010216514B2

(12) United States Patent
Wilkinson

(10) Patent No.: US 10,216,514 B2
(45) Date of Patent: Feb. 26, 2019

(54) IDENTIFICATION OF A COMPONENT FOR UPGRADE

(71) Applicant: Hewlett Packard Enterprise Development LP, Houston, TX (US)

(72) Inventor: Lyle Eric Wilkinson, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/507,815

(22) PCT Filed: Sep. 25, 2014

(86) PCT No.: PCT/US2014/057469
§ 371 (c)(1),
(2) Date: Mar. 1, 2017

(87) PCT Pub. No.: WO2016/048326
PCT Pub. Date: Mar. 31, 2016

(65) Prior Publication Data
US 2017/0286099 A1    Oct. 5, 2017

(51) Int. Cl.
*G06F 9/44* (2018.01)
*G06F 8/71* (2018.01)
(Continued)

(52) U.S. Cl.
CPC ............... *G06F 8/71* (2013.01); *G06F 8/65* (2013.01); *H04L 41/082* (2013.01);
(Continued)

(58) Field of Classification Search
CPC ........................................................ G06F 8/71
(Continued)

(56) References Cited

U.S. PATENT DOCUMENTS 5,845,077 A    12/1998  Fawcett
6,615,166 B1 *  9/2003  Guheen ............... G06Q 10/06
703/26

(Continued)

FOREIGN PATENT DOCUMENTS

CN         101393528         3/2009
WO    WO 0141072 A1 *  6/2001  ............... G06T 7/60
WO    WO-2013094003    6/2013

OTHER PUBLICATIONS

Donna Lococo, "Practical for LIMS Ugrades," Apr. 30, 2006, 15 Pgs., http://www.scientificcomputing.com/articles/2006/04/practical-planning-lims-upgrades.

(Continued)

*Primary Examiner* — Evral E Bodden
(74) *Attorney, Agent, or Firm* — Brooks, Cameron & Huebsch, PLLC

(57) ABSTRACT

Examples herein disclose receiving a first topology map that is to describe a desired software configuration for at least one of multiple components in a system. The examples disclose accessing a second topology map that is to describe a current software configuration for at least one of the multiple components in the system. The examples determine based on the first topology map and the second topology map whether the desired software configuration differs from the current software configuration. Responsive to the determination that the desired software configuration differs from the current software configuration, the examples identify which at least one of the multiple components to upgrade.

18 Claims, 6 Drawing Sheets

(51) Int. Cl.
*H04L 29/08* (2006.01)
*G06F 8/65* (2018.01)
*H04L 12/24* (2006.01)
*H04W 8/22* (2009.01)

(52) U.S. Cl.
CPC .......... *H04L 41/0866* (2013.01); *H04L 67/34* (2013.01); *H04L 41/0859* (2013.01); *H04W 8/22* (2013.01)

(58) Field of Classification Search
USPC ....................................................... 717/171
See application file for complete search history.

(56) References Cited

U.S. PATENT DOCUMENTS

| | | | |
|---|---|---|---|
| 6,826,568 B2 * | 11/2004 | Bernstein | .......... G06F 17/30569 707/749 |
| 6,983,449 B2 | 1/2006 | Newman | |
| 7,062,765 B1 * | 6/2006 | Pitzel | ......................... G06F 8/61 709/201 |
| 7,337,184 B1 * | 2/2008 | Or | ....................... G06F 17/3056 |
| 9,117,177 B1 * | 8/2015 | Carr | ........................ G06N 3/08 |
| 2007/0214215 A1 | 9/2007 | McCaleb | |
| 2009/0006070 A1 | 1/2009 | Sasatani | |
| 2012/0102481 A1 | 4/2012 | Mani | |
| 2012/0210311 A1 | 8/2012 | Kikuchi et al. | |
| 2014/0207844 A1 | 7/2014 | Mayo | |

OTHER PUBLICATIONS

International Search Authority, The International Search Report and the Written Opinion, PCT/US2014/057469, dated Jun. 23, 2015, 9 Pgs.

International Preliminary Report on Patentability received for PCT Patent Application No. PCT/US2014/057469, dated Apr. 6, 2017, 6 pages.

* cited by examiner

IDENTIFICATION OF A COMPONENT FOR UPGRADE

BACKGROUND

Downtime, also referred to as outage duration, refers to period of time when a system is unavailable. As such, the downtime refers to a period of time that the system fails to provide or perform its primary function.

BRIEF DESCRIPTION OF THE DRAWINGS

In the accompanying drawings, like numerals refer to like components or blocks. The following detailed description references the drawings, wherein.

DETAILED DESCRIPTION

Figure 1:
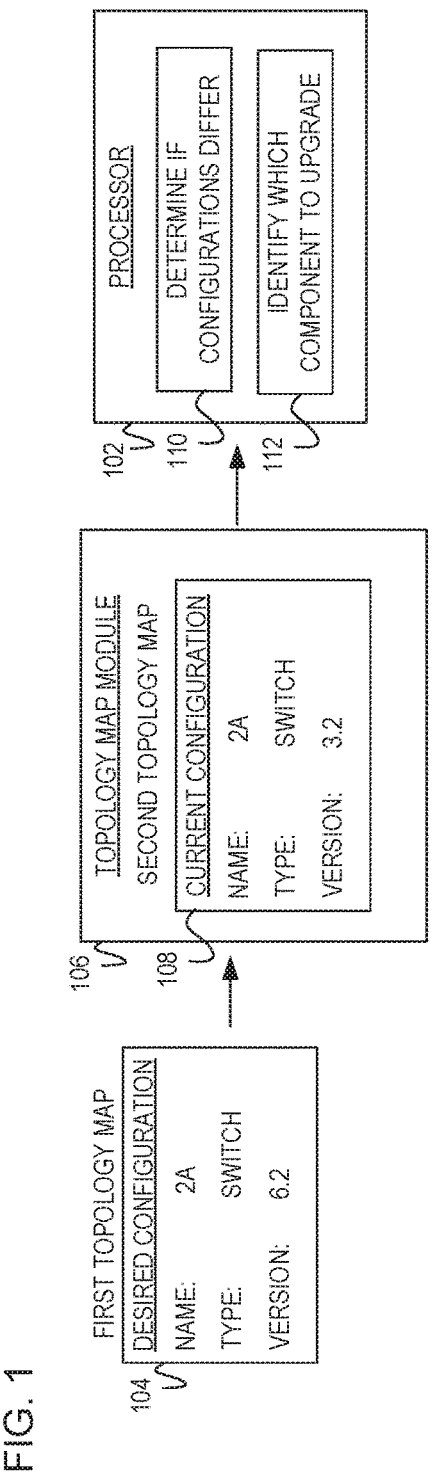
FIG. 1 is a block diagram of an example system including a first topology map and a second topology map, a processor determines if software configurations described by the topology maps differ for identifying which component to upgrade.

Downtime of a system may be caused by a variety of factors. One such factor which may cause a system outage includes upgrading software, hardware, and/or firmware which may reside on a hardware component within the system. During the upgrade, this may cause much downtime as the system is taken down to perform the upgrades. Additionally, upgrades to the system may be lengthy, human-intensive, and high-risk. Further, the upgrade to the system may be inefficient as the upgrade may be performed in a piece-by-piece manner.

To address these issues, examples disclosed herein provide an efficient mechanism for a system to identify and upgrade software to one or multiple components within the system. The examples receive a first topology map that describes a desired software configuration to at least one of the multiple components. The first topology map represents the desired state of software within the system. As such, transmitting the first topology map provides an automatic approach for the system to identify and upgrade software to at least one of the multiple components within the system.

Additionally, the examples access a second topology map that describes a current software configuration for at least one of the multiple components. Based on the first topology map and the second topology map, the system determines whether the software configurations described in both the first topology map and the second topology map differ. If the system determines these software configurations differ, the system proceeds to identify the at least one of multiple components to upgrade. Identifying the at least one of the multiple components to upgrade, enables the system to move from an existing state of software to an updated state of software.

In another example discussed herein, the system identifies multiple components for upgrade. Based upon identifying the multiple components, the system groups together redundant components among the identified multiple components for upgrade. At least two of the multiple components are considered redundant if these components serve a similar functionality within the system. Grouping together these redundant components enables the system to upgrade one of the multiple components while the other redundant component handles the workload. This minimizes disruption to the system thus enabling the system to maintain operation while upgrading software within the system.

In a further implementation, upon identifying multiple components for upgrade, the system determines a dependency of each of the identified multiple components to other components in the system. The dependency considers a hierarchy of each of the multiple components relative to other components in the system. Determining the dependency of each of the identified multiple components allows the system to determine an order in which to upgrade the identified multiple components. For example, a component that relies on several other components may be ranked for the upgrade prior to a component without dependency on other components in the system. Taking into consideration the dependency of the identified multiple components enables the system to identify the order in which to upgrade each of the identified multiple without disrupting the system.

Yet, in another example discussed herein, the computing device identifies at least one of the multiple components common in both the first topology map and the second topology map. Identifying the common component ensures the first topology map is compatible with the system described in the second topology map. System compatibility verifies if certain software described in the first topology map is compatible with the system described in the second topology map. Checking the system compatibility between the topology maps prevents upgrading incompatible software on one of the multiple components as the incompatibility may cause performance and/or reliability issues of the system.

Thus, examples disclosed herein provide an efficient mechanism to identify a component for an upgrade to its software. Identifying the component, the examples determine an order in which to perform the upgrade while minimizing disruption to a system.

Referring now to the figures, FIG. 1 is a diagram of an example system including a first topology map 104 and a topology map module 106 to access a second topology map 108. The first topology map 104 describes a desired software configuration to at least one of multiple components in the system. The second topology map 108 describes a current software configuration to the at least one of multiple components in the system. The system includes a processor 102 to process the first topology map 104 and the second topology map 108 to determine if the corresponding software configurations differ at module 110. In response to determining a difference exists between the software configurations, the processor 102 identifies the at least one of the multiple components to upgrade at module 112. The system in FIG. 1 illustrates an instance in which multiple components (not illustrated) operate in conjunction to carry out a set of operations. As such the system includes by way of example, a web server, web service, computing system, network server, network computer, or other type of computing device capable of identifying at least one of the multiple components internal to the system for upgrade. Although FIG. 1 illustrates the system as included components 106 and 102, implementations should not be limited as the system may further include the at least one of the identified multiple components for upgrade, storage, switch, and/or controller.

The first topology map 104 is a template which describes a desired software configuration for least one of the multiple components within the system. The first topology map 104 may be transmitted from an administrator or other type of entity which provides an automation mechanism for the system to identify and upgrade software for at least one of the multiple components in the system. As such, the desired software configuration described in the first topology map 104 is a desired state of the software operating at one of the multiple components leading to an upgrade for that component. The first topology map 104 may describe the desired software configuration in a programming language such as JavaScript Object Notation (JSON), Extensible Markup Language (XML), etc.

As discussed earlier, the first topology map 104 describes the desired software configuration for the at least one of the multiple components in the system and as such may include by way of example: an identifier of a component, such as a unique identifier, name, serial number, etc.; functioning of that component, including a purpose of that component within the system; dependency of each component relative to other components in the system; whether the component in the system is redundant to another component in the system; and/or mechanism in which to perform the upgrade to the identified component, such as a link to download the upgrade to the software, etc. For example as illustrated in FIG. 1, the first topology map 104 describes the desired software configuration for a switch with identifier 2A. Additionally, the desired software configuration also includes a desired version of software (i.e., 6.2) to upgrade the switch. An example of the first topology map 104 is described in detail in the next figure.

The topology map module 106 accesses the second topology map 108 upon receiving the first topology map 104. In implementations, the topology map module 106 generates the second topology map 108 through use of a database or transmitting requests to the multiple components within the system. The database may include information identifying each of the multiple components within the system and the corresponding version and/or type of software. In this implementation, the topology map module 106 uses this information from the database to construct the second topology map 108. Additionally, the second topology map 108 may be constructed upon transmitting requests seeking information from each of the multiple components within the system. Accessing and/or generating the second topology map 108, the topology map module 106 transmits the second topology map 108 to the processor 102 for determining whether the difference exists between the software configurations. Implementations of the topology map module 108 include by way of example, a virtual machine, controller, processing unit, instruction, set of instructions, process, operation, logic, technique, function, firmware, and/or software executable by the processor 102.

The second topology map 108 is a template which describes the current software configuration for the at least one of the multiple components within the system. The second topology map 108 is accessed by the topology map module 106 for processing by the processor 102. In another implementation, the second topology map 108 is generated by the topology map module 106 and as such may be maintained in storage for future access. The current software configuration described in the second topology map 108 provides a current state of software operating on the at least one of the multiple components in the system. Thus, though a comparison of the first topology map 104 describing the desired software configuration and the second topology map 108 describing the current existence of the software configuration, the system identifies whether at least one of the multiple components in the system should be upgraded. In an implementation, the second topology map 108 may describe the current software configuration in the programming language common to the first topology map 104. In this implementation, upon receiving the first topology map 104, the topology map module 106 generates the second topology map 108 in the language similar to the first topology map 104. For example, if the first topology map 104 is detailed in XML, the topology map module 106 generates the second topology map 108 in XML.

As discussed earlier, the second topology map 108 describes the current state of the software for the at least one of the multiple components in the system and as such may include by way of example: the identifier of the component; functioning of that component; dependency of each component relative to other components in the system; and whether the component in the system is redundant to another component in the system. For example as illustrated in FIG. 1, the second topology map 108 describes the current software configuration for the switch also described in the first topology map 104. In this example, the switch named 2A includes the current version of software (i.e., 5.2) operating at this switch. Thus, the processor 102 compares these topology maps 104 and 106 to determine there is a difference between the versions of software (i.e., 6.2 and 5.2). Upon determining this difference exists, the processor 102 identifies the difference is tied to the switch indicating this switch should be upgraded to version 6.2 software. An example of the second topology map 108 is described in detail in the next figure.

The processor 102 compares the first topology map 104 and the second topology map 108 to determine if the software configurations differ at module 110. Upon determining the software configurations differ at module 110, the processor 102 proceeds to identify the at least one of the multiple components in the system to upgrade. The processor 102 is a hardware component within the system which carries out instructions of a program by performing operations of the system. As such implementations of the processor 102 include, by way of example, a central processing unit, controller, microcontroller, processing unit, host processor, microprocessor, semiconductor, integrated circuit, or other type of electronic device capable of executing the modules 110-112.

At modules 110-112, the processor 102 determines if the software configurations differ and if so, the processor 102 proceeds to identify the at least one of the multiple components to upgrade. The processor 102 receives the first topology map 104 which describes the desired software configuration and the second topology map 108 which describes the current software configuration. The processor 102 compares both topology maps 104 and 108 to determine if the respective software configurations differ. Specifically, the processor 102 analyses both topology maps 104 and 108 to determine if the versions and/or types of software described in the configurations differ from one another. In an implementation, the processor 102 may identify multiple components between the first topology map 104 and the second topology map 108. In this implementation, the processor 102 identifies multiple differences between the software configurations, the multiple differences correspond to the identified multiple components for upgrade. Upon identifying the multiple components for upgrade, the processor 102 may group the identified multiple components into redundant and non-redundant components. Additionally, the processor 102 determines an order in which to upgrade each of the identified multiple components taking into consideration whether the component is redundant or non-redundant. In this manner, the processor 102 determines an ordered sequence in which to upgrade the identified multiple components. Implementations of the modules 110-112 include, by way of example, an instruction, set of instructions, process, operation, logic, technique, function, firmware, and/or software executable by the processor 102.

Figure 2:
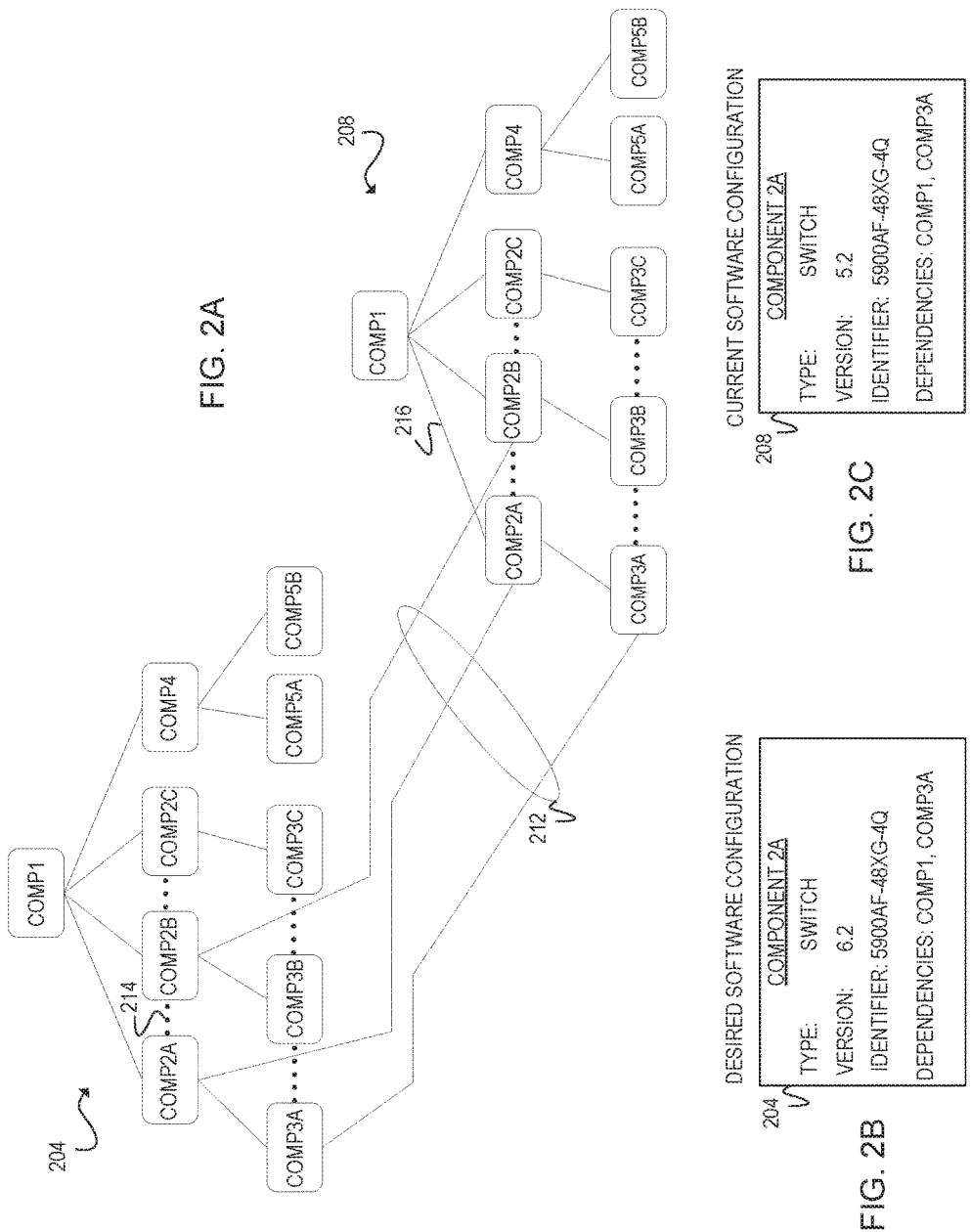
FIG. 2A is a block diagram of an example first topology map including dependencies among various components and a second topology map to identify components redundant to the first topology map for a determination of whether the first topology map is system compatible.
FIG. 2B is a data table of an example first topology map including a desired software configuration of a component in a system.
FIG. 2C is a data table of an example second topology map including a current software configuration of a component in a system.

FIGS. 2A-2C illustrate multiple components within a system that may be identified for upgrade. Accordingly, a first topology map 204 and a second topology map 208 are used for identification of differences 212 between the multiple components (COMP2A, COMP2B, and COMP3A).

FIG. 2A illustrates the differences 212 between the multiple components (e.g., COMP2A, COMP2B, and COMP3A). The differences 212 identified between the multiple components are represented with a dashed line. As such, it is assumed a computing device, such as processor has recognized a difference between the desired software configuration and the current software configuration between these components (e.g., COMP2A, COMP2B, and COMP3A). Thus, the computing device may proceed to identify a dependency 216 of these multiple components relative to other multiple components. Additionally, the computing device may determine which of the multiple components in each topology map 204 and 208 may be redundant 214 to each other. The dependency 216, as indicate with a solid line, lists a hierarchy of the component to the other multiple components within the respective topology map 204 or 208. This dependency 216 is used to determine an order of operation in which to upgrade the identified multiple components which should be upgraded (e.g., COMP2A, COMP2B, and COMP3A). The redundancy 214, as indicated with a dotted line, between multiple components in the topology maps 204 and 208 represents when at least two components in each topology map 204 and 208 include a similar functionality. For example in the first topology map 204, COMP2A is redundant to COMP2B and COMP2C while COMP3A is redundant to COMP3B. In the second topology map 208, COMP2A is redundant to COMP2B and COMP2C while COMP3A is redundant to COMP3B. The redundancy 214 and the dependency 216 enable the computing device to determine an ordered sequence of which of the identified multiple components e.g., COMP2A, COMP2B, and COMP3A) to upgrade first, second, third, etc. In this manner, the redundancy 214 and the dependency 216 drives up the order of a particular component. For example, as indicated with the dotted line the multiple components including COMP2A, COMP2B, and COMP3A in the first topology map 204 are redundant to COMP2A, COMP2B, and COMP3A in the second topology map 208. As such, upon the upgrade to one of these components (COMP2A, COMP2B, and COMP3A), the other redundant component(s) may take over during operation of the upgrade. This allows one of these components to go out of service for performing the upgrade while the other redundant components may handle a workload of the system.

FIGS. 2B-2C illustrate example data tables of the first topology map 204 and the second topology map 208. The first topology map 204 describes a desired software configuration for a switch in a system. The second topology map 204 describes a current software configuration for the switch in the system. The topology maps 204 and 208 as data tables may be used in conjunction with the graph represented in FIG. 2A. For example, for each of the multiple components in FIG. 2A (e.g., COMP1, COMP2A-2C, COMP3A-3C, COMP4, and COMP5A-5B), a data table may be used for additional details about that respective component. Additionally, although FIGS. 2B-2C illustrate the topology maps 204 and 208 as describing the desired software configuration and current software configuration for the switch, implementations should not be limited as the topology maps 204 and 208 may include configurations for multiple components in the system.

The topology maps 204 and 208 as in FIGS. 2B-2C illustrate the desired software configuration and the current software configuration for the switch. The topology maps 204 and 208 include an identifier (e.g., 5900AF-48XG-4Q), type of functionality for the component (e.g., SWITCH), a version of the desired software and current software (e.g., 6.2 and 5.2), and dependencies for that component relative to other components (COMP 1, COMP3A). These topology maps 204 and 208 are compared to recognize whether the software configurations include a difference to the versions of the software. In this case, there is a difference between the desired version of software the current version of software. As such, upon identification of the difference, the component is identified for the upgrade.

Figure 3:
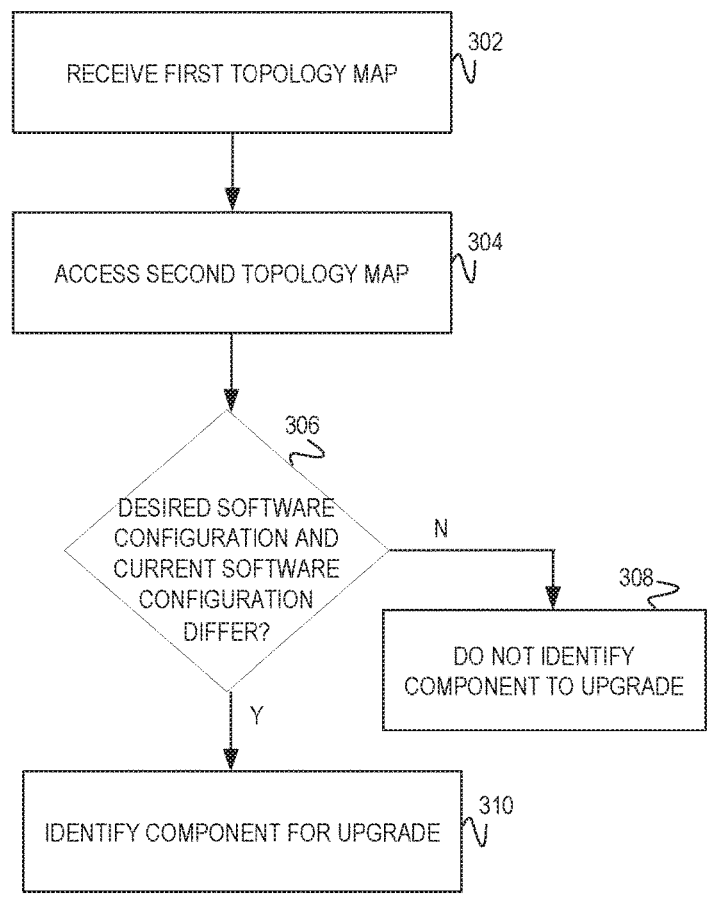
FIG. 3 is a flowchart of an example method to receive a first topology map and access a second topology map, the method determines if software configurations corresponding to the topology maps differ for identifying a component for upgrade.

FIG. 3 is a flowchart of an example method, executable by a computing device, to receive a first topology map and access a first topology map. The first topology map describes a desired software configuration to at least one of multiple components in a system. The second topology map describes a current software configuration to the at least one of multiple components. The computing device uses the first topology map and the second topology map to determine if these software configurations differ. If the computing device determines these software configurations differ, this indicates the at least one of multiple components should be upgraded. Determining the software configurations differ, the computing device proceeds to identify the at least one of multiple components which should be upgraded. If the computing device determines the software configurations do not differ, the computing device does not identifying the at least one of multiple components for upgrade. In discussing FIG. 3, references may be made to the components in FIGS.

1-2 to provide contextual examples. For example, the processor 102 as in FIG. 1 executes operations 302-310 for identifying which components to upgrade within the computing system based upon determining a difference exists between the desired software configuration and the current software configuration. In another example, a computing system as in FIG. 1 executes operations 302-310. Further, although FIG. 3 is described as implemented by the processor 102, it may be executed on other suitable components. For example, FIG. 3 may be implemented in the form of executable instructions on a machine-readable storage medium 604 as in FIG. 6.

At operation 302, the computing device receives the first topology map which describes the desired software configuration to the at least one of multiple components in the system. The first topology map includes an identifier to the at least one of the multiple components and/or the version and/or type of software which should be in place for the one of the multiple components. The first topology map may be transmitted from an administrator or other type of entity which provides an automation mechanism for the computing device to identify and upgrade at least one of the multiple components. As such, the desired software configuration described in the first topology map is a desired state of one of the multiple components leading to an upgrade for that component.

At operation 304, the computing device accesses the second topology map which describes the current software configuration of the at least one of multiple components in the system. The second topology map includes an identifier to the at least one of the multiple components and the corresponding current type and/or version of software which may be in use by the component. Operation 304 includes generating the second topology map through the use of a database and/or transmitting requests of information to each of the multiple components in the system. The database may include a list of each of the multiple components in the system with the corresponding type and/or version of software which is in current operation with the respective component. The computing device may reference the database to compile a data structure similar to the first topology map, thus creating the second topology map describing the current software configuration in use by the at least one of the multiple components. In another implementation, the computing device may transmit the request to the at least one of the multiple components to compile the second topology map with the at least one of the multiple components and the current type and/or version of software.

At operation 306, the computing device determines if the desired software configuration described in the first topology map differs from the current software configuration described in the second topology map. The software configurations include the identifier of one of the multiple components and may also include the version and/or types of software corresponding to that one of multiple components. Thus, the computing device compares the versions and/or types of software within the software configurations to determine if the software corresponding to the one of multiple components to upgrade. Thus the computing device compares the version and/or types of software in use by the particular component to determine if that software should be upgraded.

At operation 308, the computing device does not identify at least one of the multiple components to upgrade. Upon determining the software configurations do not differ, the computing device does not identify which component to upgrade.

At operation 310, upon identifying the difference between the software configurations, the computing device identifies which of the multiple components to upgrade. The difference is an unlikeness or dissimilarity between the versions and/or types of software between the software configurations. Upon determining this difference exists between the software configurations, the computing device identifies the corresponding component.

Figure 4:
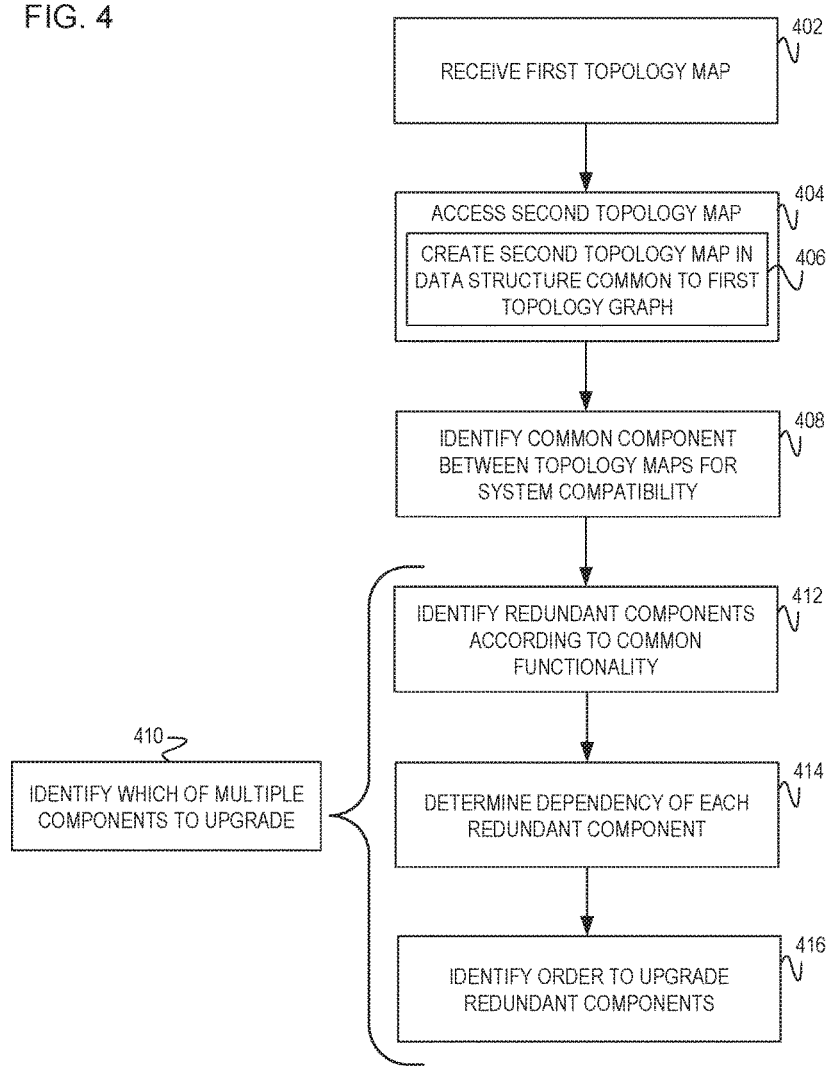
FIG. 4 is a flowchart of an example method to determine a difference between a first topology map and a second topology map for identifying which components to upgrade in a system.

FIG. 4 is a flowchart of an example method, executable by a computing device, to determine a difference between a first topology map and a second topology map. The difference is determined based on the difference between software configurations. The first topology map describes a desired software configuration for at least one of multiple components while the second topology map describes a current software configuration for the at least one multiple component. Thus, the computing device determines whether a difference exists between these software configurations to identify the at least one multiple component which should be upgraded. In another implementation, the computing device determines multiple differences exist between the software configurations. Identifying the multiple differences, the computing device identifies which multiple components should be upgraded. Identifying multiple components for upgrade, the computing device may group these identified multiple components into group(s) of redundant component(s). Additionally, the computing device determines the dependency of each of multiple components to enable an identification of an order in which to perform the upgrade to each of the identified multiple components. In discussing FIG. 4, references may be made to the components in FIGS. 1-2C to provide contextual examples. For example, the processor 102 as in FIG. 1 executes operations 402-416 for identifying which components to upgrade within the computing system based upon determining a difference exists between the desired software configuration and the current software configuration. In another example, a computing system as in FIG. 1 executes operations 402-416. Further, although FIG. 4 is described as implemented by the processor 102, it may be executed on other suitable components. For example, FIG. 4 may be implemented in the form of executable instructions on a machine-readable storage medium 604 as in FIG. 6.

At operation 402, the computing device receives the first topology map which describes the desired software configuration to at least one of the multiple components in the system. The first topology map may be transmitted from an administrator or other type of entity which provides an automation mechanism for the computing device to identify and upgrade at least one of the multiple components. As such, the desired software configuration described in the first topology map is a desired state of one of the multiple components leading to an upgrade for that component. Operation 402 may be similar in functionality to operation 302 as in FIG. 3.

At operation 404 the computing device accesses the second topology map which describes the current state of the software for at least one of the multiple components in the system. The second topology map may be created prior to receipt of the first topology map and as such may be stored for future access. In another implementation, the computing device generates the second topology map as at operation 406. Operation 404 may be similar in functionality to operation 304 as in FIG. 3.

At operation 406, the computing device creates the second topology map describing the current software configuration of at least one of the multiple components. Receiving the first topology map at operation 402, signals to the computing device to generate the second topology map for identifying which of the multiple components should be upgraded. In one implementation, the computing device generates the second topology map according to a database listing current software configurations for each of the multiple components. In another implementation, the computing device may transmit a request to each of the multiple components in the system to determine the current state of software for each of the multiple components. To be able to determine whether the difference exists between the topology maps, the second topology may be generated in a data structure common to the first topology map. The data structure may include, by way of example, JavaScript Object Notation (JSON), Extensible Markup Language (XML), etc.

At operation 408, the computing device may determine the system compatibility between both of the topology maps prior to identifying which of the multiple components should be upgraded. The system compatibility checks whether the software listed in the desired software configuration is compatible with the system. Compatibility verifies if certain software which may be listed in the desired software configuration can run or operate in the system. In this manner, operation 408 provides a check by identifying one of the components common between the first topology and second topology maps. Otherwise if the system is incompatible with the first topology map, at least one of the multiple components may be falsely identified for upgrade, which means performance and/or reliability of the system may be affected. Upon determining the system compatibility, the computing device may identify at least one of the multiple components which should be upgraded based on the observed difference. If the computing device identifies multiple components which should be upgraded, the computing device may group the multiple components into redundant and non-redundant components. The redundant components are considered those components in the system which may have a similar functionality, thus this enables minimal disruption to the system when completing the upgrade. This implementation may be described in detail in the next figure.

At operation 410, the computing device identifies at least one of the multiple components which should be upgraded. The computing device processes the first topology map and the second topology map to determine whether at least one of the multiple components should be upgraded. This may be indicated by the difference between the desired software configuration and the current software configuration. The difference indicates whether at least one of the multiple components in the computing system should be upgraded. Identifying at least one of the multiple components which should be upgraded, the computing device may schedule how to handle the upgrade to minimize the disruption to the system. In other implementations, the computing device identifies multiple components for upgrade. Identifying multiple components, the computing system ranks and filters which of the upgrades should be performed in an efficient manner as at operations 412-416. Operation 410 may be similar in functionality to operation 310 as in FIG. 3.

At operation 412, upon identifying multiple components for upgrade at operation 410, the computing device groups these identified multiple components into redundant groups. Each redundant group is categorized according to their functionality listed in the second topology map.

At operation 414, the computing device determines the dependency of each of the redundant component relative to other components within the system. The computing device identifies which of the multiple components to upgrade at operation 410 and as such groups together the redundant components according to the functionality as at operation 412. Thus identifying the redundant components within the computing system for upgrade, the computing device determines the hierarchy of each of the identified components for upgrade. The dependency may be used in determine the order in which to upgrade these components as at operation 416.

At operation 416, the computing device determines the order in which to upgrade the identified redundant components. The order in which to upgrade the identified redundant components includes a list of proposed steps in a ranking of which of the identified redundant component to upgrade in order. The order may be arranged according to the dependency of the identified redundant components as at operation 414. The more dependent, the sooner or higher in order in which to perform the upgrade to the identified redundant component.

Figure 5:
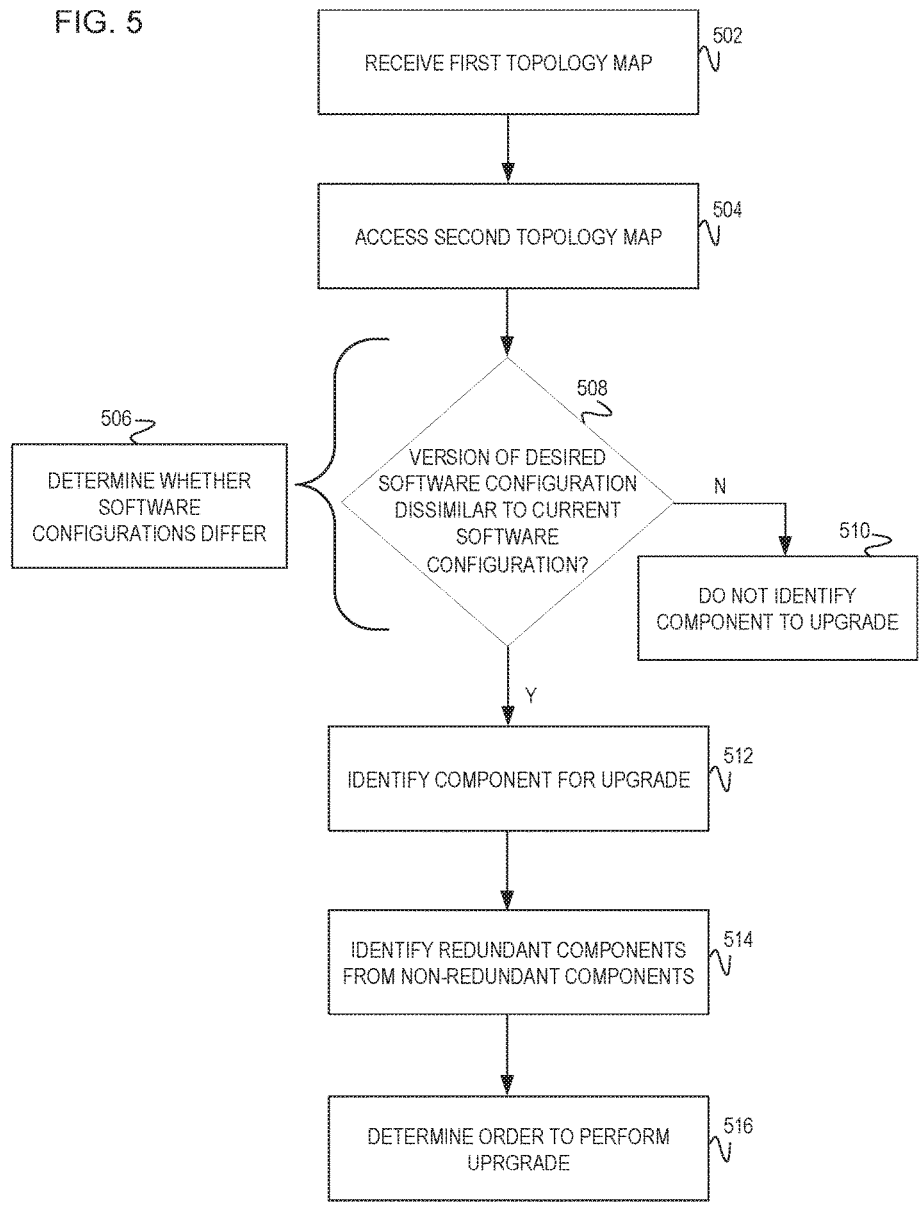
FIG. 5 is a flowchart of an example method to receive a first topology map and accessing a second topology map to determine a difference in software configuration between the topology maps, identifying multiple components for upgrade, and determining an order in which to upgrade the identified components.

FIG. 5 is a flowchart of an example method, executable by a computing device, to receive a first topology map which describes a desired software configuration to at least one component within a computing system. The computing device accesses a second topology map which describes a current software configuration to the at least one component in the computing system. The computing device determines whether the desired software configuration and the current software configuration differ. In one implementation, the computing device determines whether a version of the desired software configuration is dissimilar to the current software configuration. If the computing device determines the versions of software referenced in the desired and the current configuration are not dissimilar, or in other words, are similar, the computing device does not identify which component to upgrade. Upon determining the versions in the configurations are dissimilar, the computing device proceeds to identify which the component for upgrade. Determining which of multiple components to upgrade, the computing device identifies redundant components from non-redundant components. A component is considered redundant when the component described in the second topology map includes a similar functionality to another component in the second topology map. This enables one of the components for upgrade while the other component takes over functionality during upgrade. Upon determining the redundant components in the second topology graph, the computing device also determines which of the components identified for upgrade include non-redundant components. Identifying the redundant and the non-redundant components from the multiple components identified for upgrade, the computing device determines the order of components to perform the upgrade. Identifying the redundant and the non-redundant components from the multiple components which may be identified for upgrade, the computing device determines the order in which to perform the upgrade to minimize disruption to the functionality of the computing system. In discussing FIG. 5, references may be made to the components in FIGS. 1-2 to provide contextual examples. For example, the processor 102 as in FIG. 1 executes operations 502-516 for identifying which components to upgrade within the computing system based upon determining a difference exists between the desired software configuration and the current software configuration. In another example, a computing system as in FIG. 1 executes operations 502-516. Further, although FIG. 5 is described as implemented by the processor 102, it may be executed on other suitable components. For example, FIG. 5 may be implemented in the form of executable instructions on a machine-readable storage medium 604 as in FIG. 6.

At operation 502, the computing device receives the first topology map. The first topology map includes desired software configurations to at least one component within the computing system. As such, the first topology map includes updates to at least one of the component within the computing system and represents the desired state of the computing system. Operation 502 may be similar in functionality to operations 302 and 402 as in FIGS. 3-4.

At operation 504, the computing device accesses the second topology map. The second topology map includes current software configurations of at least one component internal to the computing system. As such, the second topology map may be generated upon receipt of first topology map or generated prior to receipt of the first topology map. The second topology map represents what is in current existence on the components within the computing system. Operation 504 may be similar in functionality to operations 304 and 404 as in FIGS. 3-4.

At operation 506, the computing device determines whether the desired software configuration described in the first topology map and the current software configuration described in the second topology map differ. The difference between the software configurations include, by way of example, whether versions of software differ between the configurations as at operation 508. Operation 506 may be similar in functionality to operation 306 as in FIG. 3.

At operation 508, the computing device determines if the version of the desired software configuration is dissimilar to the version of the current software configuration. Each of the software configurations describe the version of software corresponding to a particular component. As such, the desired software configuration may include an update to the software corresponding to the particular component while the current software configuration includes the current version of software in use at the particular component. Thus, identifying which version of software the particular component is using enables the computing device to determine whether the particular component should be upgraded. The version is a representation unique to a state of software at the particular component. As such the version may include, by way of example, a number, identifier, value, representation, or other type of indicator which is unique to the state of software for the particular component. If the computing device determines the versions of software in the desired software configuration and the current software configuration are different or dissimilar, this indicates the particular component corresponding to the version should be upgraded. Thus, the computing device identifies the component which should be upgraded at operation 512. If the computing device determines the versions determines the versions of software in the desired software configuration and the current software configuration are similar, this indicates the particular component may be operating with the desired version of software. Thus the computing device proceeds to operation 510 and does not identify the particular component for the upgraded as the similarity indicates there may be no updates needed to the software at the current time period.

At operation 510, the computing device does not identify the particular component for the upgrade. Upon the computing device determining the version of software in the configurations are similar, this indicates the software operating on the multiple component may already be update and thus the computing device does not identify the component for upgrade. Operation 510 may be similar in functionality to operation 308 as in FIG. 3.

At operation 512, upon identifying there is a difference between the versions of software between the software configurations, the computing device identifies the particular component which should be updated. If the desired software configuration and the current software configuration describe versions of software among multiple components, the computing device determines if differences exist between the software configurations. Identifying multiple differences, the computing device identifies the multiple components which should include updates to the software. Upon identifying the multiple components for the upgrade, the computing device may group these components into redundant and/or non-redundant components such as at operation 514. Operation 512 may be similar in functionality to operations 310 and 410 as in FIGS. 3-4.

At operation 514, upon identifying multiple components for upgrade at operation 512, the computing device groups these multiple components into redundant components and non-redundant components. The redundant components are grouped together according to the functionality described in the second topology map. Thus, if at least two components include a similar functionality, this would indicate the redundancy among those components. If these at least two components include a different purpose or functionality, this indicates the non-redundancy of these components. For example, if the system includes two networking switches and both were identified for upgrades at operation 512, the computing device processes the second topology map to determine if these networking switches have a common functionality. In this example, if both networking switches operate to route packets accordingly, this indicates the redundancy to both of these components. However, if one of the networking switches is to route the packets while the other networking switch is to receive the packets without routing, this would indicate the non-redundancy functionality. Operation 514 may be similar in functionality to operation 412 as in FIG. 4.

At operation 516, the computing device determines the order in which to perform the upgrade to the components identified for the upgrade. Upon identifying the redundant components from the non-redundant components in the computing system, the order in which to perform the upgrade ranks the redundant components for upgrade prior to the upgrade of the non-redundant components. The order in which to perform the upgrade to the components enables the computing device to minimize the cost of disruption of the system.

Figure 6:
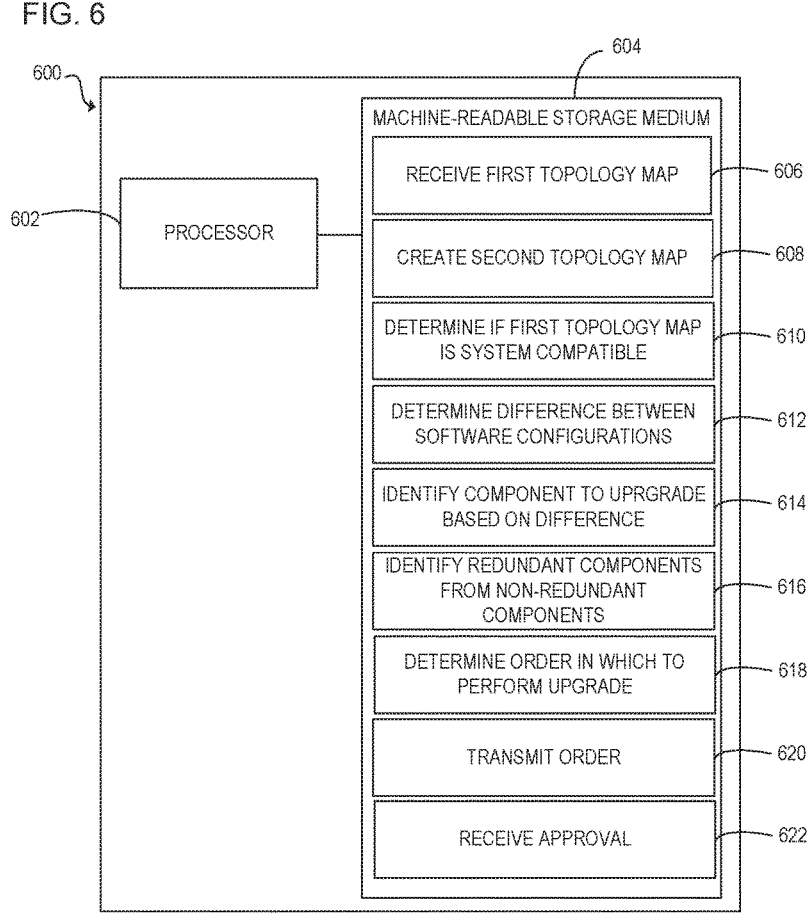
FIG. 6 is a block diagram of an example computing device with a processor to execute instructions in a machine-readable storage medium for receiving a first topology map and creating a second topology map to determine a difference between the topology maps for identifying a component for upgrade and an order in which to perform the upgrade.

FIG. 6 is a block diagram of computing device 600 with a processor 602 to execute instructions 606-622 within a machine-readable storage medium 604. Specifically, the computing device 600 with the processor 602 determines a difference between software configurations in a first topology map and a second topology map. Upon determining whether the difference exists, the computing device 600 identifies multiple components for upgrade and an order in which to upgrade the multiple components. Although the computing device 600 includes processor 602 and machine-readable storage medium 604, it may also include other components that would be suitable to one skilled in the art. For example, the computing device 600 may include other components such as a controller and/or data storage area. The computing device 600 is an electronic device with the processor 602 capable of executing instructions 606-622, and as such embodiments of the computing device 600 include a server, web service, computing device, computing system, web server, network computer, personal computer, desktop computer, laptop, or other type of electronic device capable of executing instructions 606-622. The instructions 606-622 may be implemented as methods, functions, operations, and other processes implemented as machine-readable instructions stored on the storage medium 604, which may be non-transitory, such as hardware storage devices (e.g., random access memory (RAM), read only memory (ROM), erasable programmable ROM, electrically erasable ROM, hard drives, and flash memory).

The processor 602 may fetch, decode, and execute instructions 606-622 to identify the difference between two topology maps for upgrading the corresponding component. In one implementation, upon executing instructions 606-614, the processor 602 may proceed to execute instructions 616-622. Specifically, the processor 602 executes instructions 606-614 to: receive the first topology map which describes a desired software configuration for at least one of multiple components within a computing system; create the second topology map which describes a current software configuration of the at least one component in the system; determine if the first topology map is system compatible with the system described in the second topology map by identifying a common component between the topology maps; determine if there is a difference between both the desired software configuration and current software configuration by comparing the first topology map and the second topology map; and identify the component among the multiple components described in the topology maps for upgrade. The processor 602 executes instructions 616-622 to: upon identifying multiple components for upgrade, identify which of the multiple components are redundant and which of the multiple components are non-redundant; determine an order in which to upgrade the multiple components where the redundant components are upgraded prior to the non-redundant components; transmit the order in which to upgrade the multiple components; and receive approval to proceed with upgrading the multiple components according to the upgrade.

The machine-readable storage medium 604 includes instructions 606-622 for the processor 602 to fetch, decode, and execute. In another embodiment, the machine-readable storage medium 604 may be an electronic, magnetic, optical, memory, storage, flash-drive, or other physical device that contains or stores executable instructions. Thus, the machine-readable storage medium 604 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 604 may include an application and/or firmware which can be utilized independently and/or in conjunction with the processor 602 to fetch, decode, and/or execute instructions of the machine-readable storage medium 604. The application and/or firmware may be stored on the machine-readable storage medium 604 and/or stored on another location of the computing device 600.

Thus, examples disclosed herein provide an efficient mechanism to identify a component for an upgrade to its software. Identifying the component, the examples determine an order in which to perform the upgrade while minimizing disruption to a system.

I claim:

1. A method comprising:
receiving a first topology map that describes a desired software configuration for multiple components in a system, wherein the desired software configuration includes a desired software version;
accessing a second topology map that describes a current software configuration for the multiple components in the system, wherein the current software configuration includes a current software version;
determining based on the first topology map and the second topology map that the desired software configuration differs from the current software configuration;
responsive to the determination that the desired software configuration differs from the current software configuration, identifying which of the multiple components to upgrade, including:
identifying redundant components according to a common functionality from among the multiple components to upgrade; and
identifying an order of upgrade for each of the redundant components by prioritizing the redundant components that have dependencies on other components;
automating an upgrade at the identified component among the multiple components by upgrading a current software configuration of the identified components from the current software version to the desired software version.

2. The method of claim 1 wherein identifying which of the multiple components to upgrade comprises:
determining a dependency of each of the redundant components relative to other multiple components in the system; and
identifying the order of the upgrade for each of the redundant components based on the determined dependency of each of the redundant components.

3. The method of claim 1 comprising:
determining that the first topology map and the second topology map are system compatible via identification of multiple components common to both topology maps.

4. The method of claim 1 wherein determining based on the determining based on the first topology map and the second topology map that the desired software configuration differs from the current software configuration comprises:
determining that a version of the desired software configuration is dissimilar to a version of the current software configuration.

5. The method of claim 1 comprising:
identifying redundant components from non-redundant components among the multiple components to upgrade, the redundant components share a common functionality;
identifying an order of upgrade of each of the multiple components to upgrade.

6. The method of claim 1 comprising:
creating the second topology map in a data structure common to the first topology map.

7. A system comprising:
a topology map module to:
receive a first topology map that describes a desired software configuration for multiple components in the system, wherein the desired software configuration includes a desired software version;
generate a second topology map that describes a current software configuration for the multiple components in the system, wherein the current software configuration includes a current software version; and a processor to:
- determine based on the first topology map and the second topology map that the desired software configuration differs from the current software configuration;
- identify which of the multiple components to upgrade in the system based on the determination the first topology map and the second topology map differ, including:
  - identifying redundant components according to a common functionality from among the multiple components to upgrade; and
  - identifying an order of upgrade for each of the redundant components by prioritizing the redundant components that have dependencies on other components;
- automate the upgrade to the identified component among the multiple components by upgrading a current software configuration of the identified component from the current software version to the desired software version.

8. The system of claim 7 wherein the first topology map and the second topology map include a dependency relationship for the multiple components.

9. The system of claim 7 comprising:
the multiple components that are upgraded to the desired software configuration.

10. The system of claim 7 wherein the processor is further to:
identify that the first topology map is compatible to the system based on an identification of the multiple components that are common between the first topology map and the second topology map.

11. A non-transitory machine-readable storage medium comprising instructions that when executed by a processing resource cause a computing device to:
- receive a first topology map that is to describe a desired software configuration for at least one of multiple components in a system, wherein the desired software configuration includes a desired software version;
- creating a second topology map that is to describe a current software configuration for at least one of the multiple components in the system, wherein the current software configuration includes a current software version;
- determining a difference between the desired software configuration and the current software configuration;
- identifying which at least one of the multiple components to upgrade based on the determined difference, including:
  - identifying redundant components according to a common functionality from among the multiple components to upgrade; and
  - identifying an order of upgrade for each of the redundant components by prioritizing the redundant components that have dependencies on other components; and
- automating an upgrade of an identified component among the multiple components by upgrading a current software configuration of the identified components from the current software version to the desired software version.

12. The non-transitory machine-readable storage medium of claim 11 comprising instructions that when executed by the processor resource cause the computing device to:
- identify redundant components from non-redundant components among the identified multiple components to upgrade, the redundant components share a common functionality;
- determine an order of upgrade for each of the identified multiple components to upgrade, wherein the redundant components are upgraded prior to the non-redundant components; and
- automate the upgrade to the identified component among the multiple components based on the order of upgrade.

13. The non-transitory machine-readable storage medium of claim 12 comprising instructions that when executed by the processor resource cause the computing device to:
- transmit the order of the upgrade for each of the identified multiple components to upgrade; and
- receive approval to proceed with the upgrade.

14. The non-transitory machine-readable storage medium of claim 11 comprising instructions that when executed by the processor resource cause the computing device to:
- identify a dependency for at least one of the multiple components identified for upgrade, the dependency is a relationship of functioning between at least one of the multiple components and another component within the system; and
- determine an order for performing the upgrade to at least one of the multiple components identified for upgrade based on the identified dependency.

15. The non-transitory machine-readable storage medium of claim 11 comprising instructions that when executed by the processor resource cause the computing device to:
determine whether the first topology map and the second topology map are system-compatible by identifying at least one of the multiple components as common between the first topology map and the second topology map.

16. The method of claim 1 comprising:
upgrading the identified multiple components to the desired software configuration.

17. The method of claim 5 wherein automating the upgrade to the identified component comprises:
upgrading the redundant components prior to upgrading the non-redundant components.

18. The system of claim 7 comprising:
prioritizing upgrades to the multiple components that have dependencies on other components.

* * * * *